REFLECTION OF AN INFINITE PLANE

REFLECTING STRIP

INVENTORS
Samuel Freedman
BY Giusto Fonda Bonardi
Ralph L Chappell
ATTORNEY

HORIZONTALLY POLARIZED FIELDS IN NEIGHBORHOOD OF REFLECTOR

INVENTORS
Samuel Freedman
BY Giusto Fonda Bonardi
Ralph L Chappell
ATTORNEY

Dec. 16, 1952 S. FREEDMAN ET AL 2,622,242

TUNED MICROWAVE REFLECTOR

Filed May 9, 1945 7 Sheets-Sheet 3

INVENTORS
Samuel Freedman
BY Giusto Fonda Bonardi
Ralph L Chappell
ATTORNEY

TUNED MICROWAVE REFLECTOR

Filed May 9, 1945 7 Sheets-Sheet 4

REFLECTED POWER vs FREQUENCY AND REFLECTION ANGLE

REFLECTED POWER VS. REFLECTION ANGLE AND FREQUENCY

INVENTORS
Samuel Freedman
BY Giusto Fonda Bonardi
Ralph L Chappell
ATTORNEY

TUNED MICROWAVE REFLECTOR

Filed May 9, 1945 7 Sheets-Sheet 5

UNSYMMETRY WHEN ANGLE FROM REFLECTOR TO ANTENNA DOES NOT EQUAL REFLECTION ANGLE

DIFFRACTION EFFECTS FOR UNSYMMETRICAL POSITION

UNSYMMETRY WHEN ANTENNA IS NOT IN XY PLANE

INVENTORS
Samuel Freedman
BY Giusto Fonda Bonardi
Ralph L Chappell
ATTORNEY

REFLECTOR STRIP FOR VERTICALLY POLARIZED FIELD

INVENTORS
Samuel Freedman
Giusto Fonda Bonardi
BY Ralph L. Chappell
ATTORNEY

TUNED MICROWAVE REFLECTOR

Filed May 9, 1945 7 Sheets-Sheet 7

VERTICALLY POLARIZED FIELDS IN NEIGHBORHOOD OF REFLECTOR

INVENTORS
Samuel Freedman
BY Giusto Fonda Bonardi
Ralph L Chappell
ATTORNEY

Patented Dec. 16, 1952 2,622,242

UNITED STATES PATENT OFFICE 2,622,242

TUNED MICROWAVE REFLECTOR

Samuel Freedman, United States Navy, and Giusto Fonda Bonardi, Manhattan Beach, Calif.

Application May 9, 1945, Serial No. 592,802

11 Claims. (Cl. 343—18)

This invention relates to surface microwave reflectors, and physically and mathematically solves the problem of boundary condition resulting when a reflecting plane is of finite (i. e. a dimension feasible to provide) rather than infinite dimension (i. e. a dimension which is not feasible to provide). As a result, a reflector of finite dimension is provided which will focus, defocus and beam radio signals through space at microwave frequencies (i. e. frequencies of the order of those generated by the method and means disclosed in our copending application Serial No. 587,544, filed April 10, 1945) with an efficiency comparable to that of an infinite plane.

The reflector of this invention differs from others previously known because of the phase shifting ends. The ends tend to annul the standing waves on the reflector and thus avoid undesired radiation proceeding therefrom.

These phase shifting ends may be used to improve the efficiency of any kind of surface reflector. The term "surface reflector" includes straight, bent or shaped reflectors (as distinguished from dipole reflectors) associated with transmitting or receiving systems. A flat reflector with phase shifting ends is provided for horizontally polarized waves and a similar reflector with the addition of vertical wings to the edges and to the phase shifting ends is provided for vertically polarized waves. These phase shifting ends and wings are tuned or made correct for the frequency employed and the angle of reflection desired.

In accordance with the teachings of the present invention small reflectors are now designed which have the behaviour of an infinite conducting plane. We may compare it with the efficiency of a beam of light and a reflectng mirror. A beam of light being very short in wave length makes the reflecting mirror infinitely greater in dimension. However, in microwaves this is not the case. Here a reflector for example might be 3 feet or a meter wide while the wave length of the radio wave might be a matter of inches or centimeters. These finite dimensions have heretofore resulted in standing waves and unfavorable conditions on the reflector. The present invention eliminates or nullifies the effects of these unfavorable features.

Figure 1:
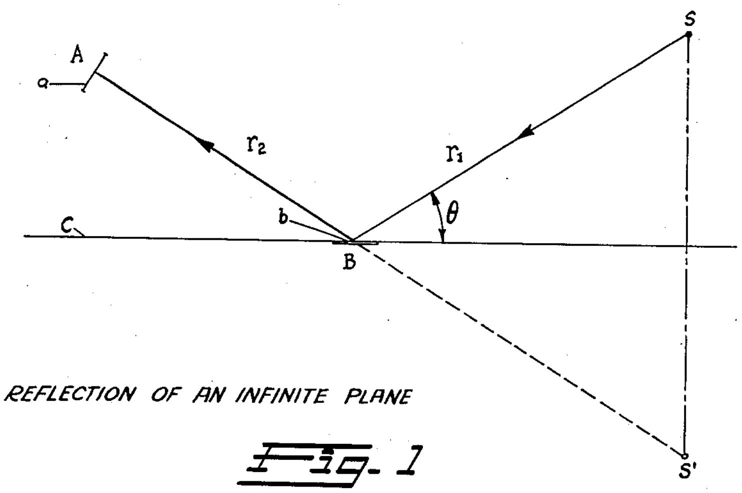
Figure 2:
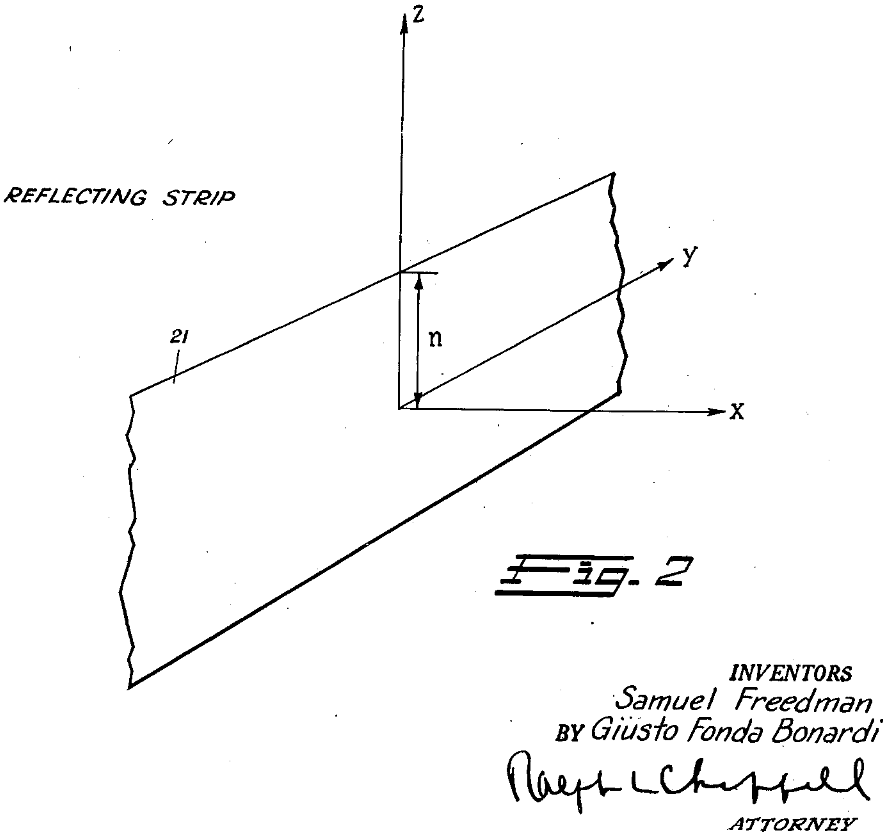
Figure 3:
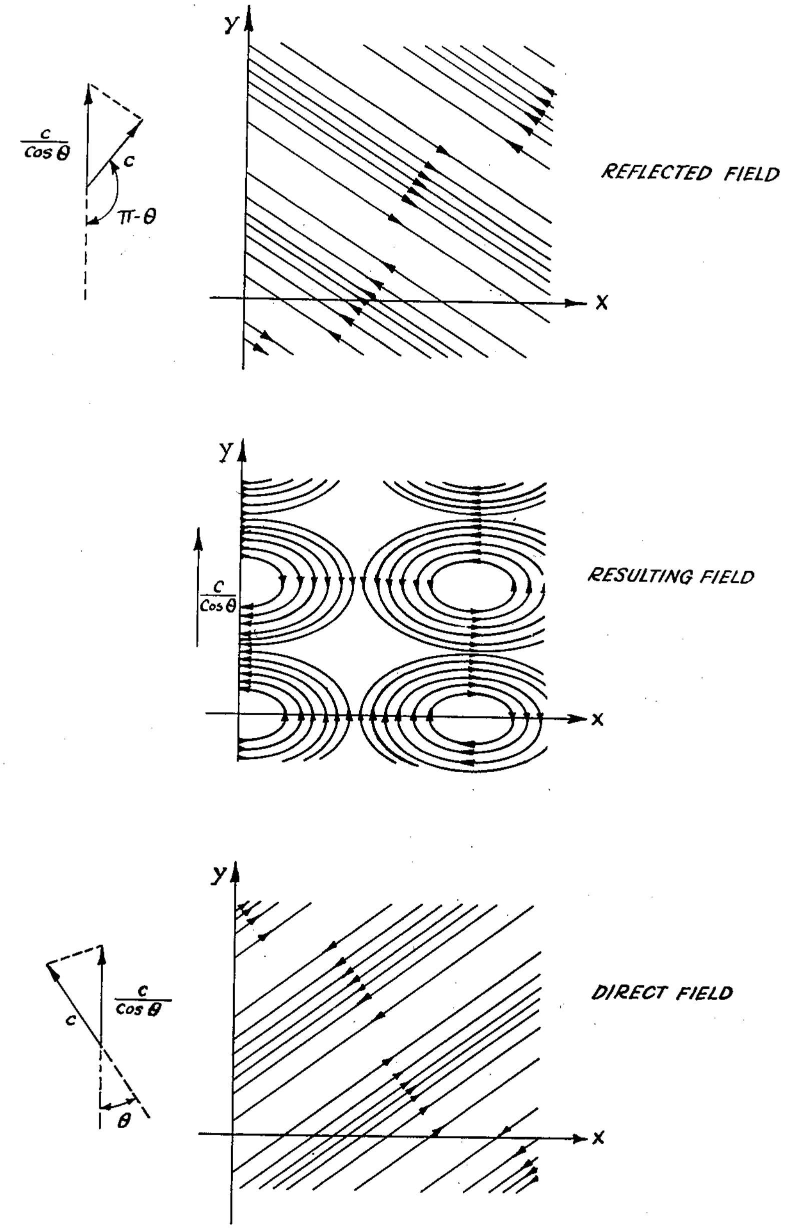
Figure 4:
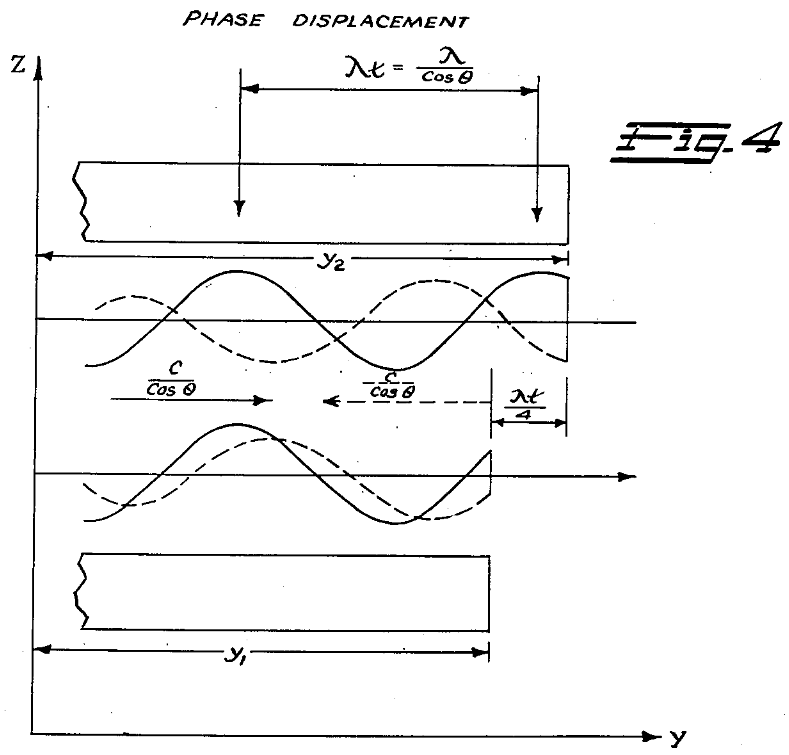
Figure 5:
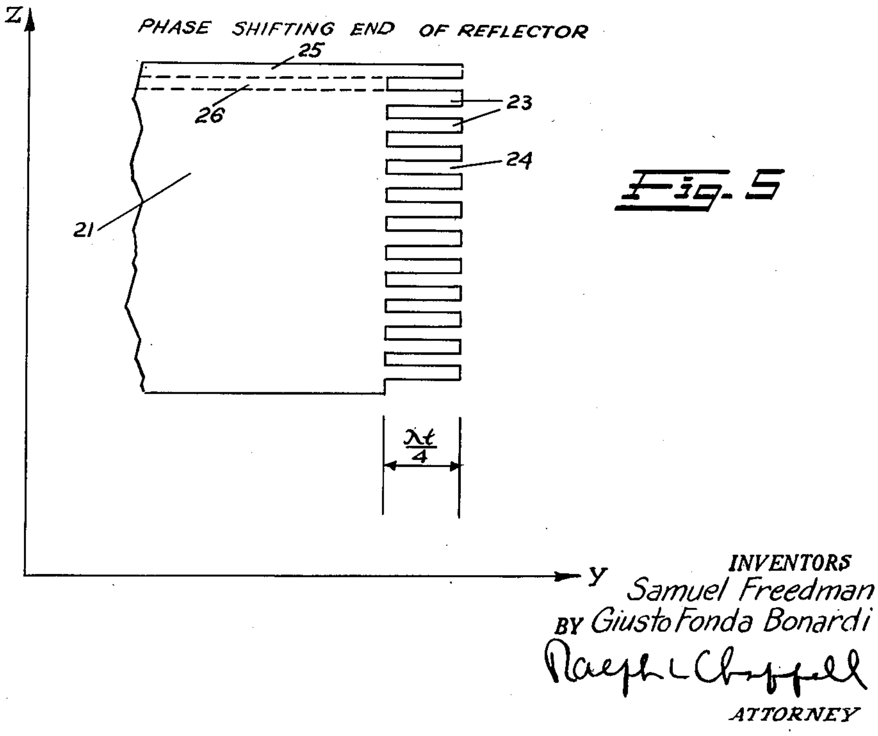
Figure 6:
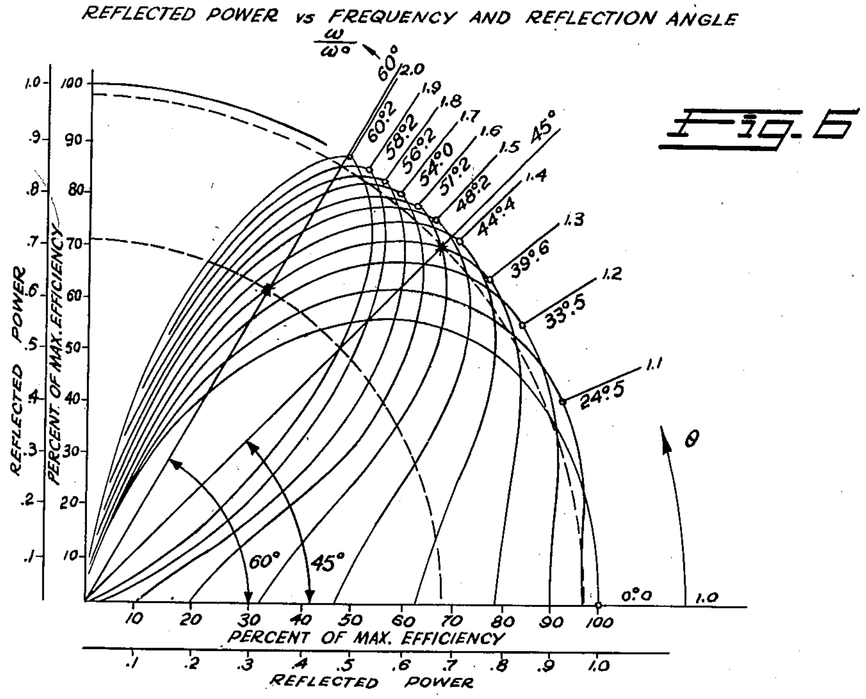
Figure 7:
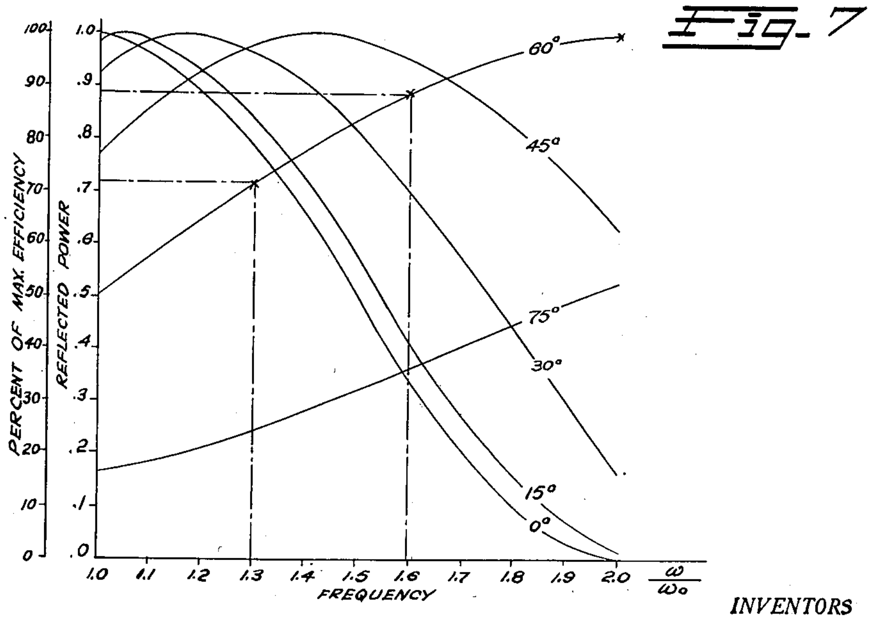
Figure 8:
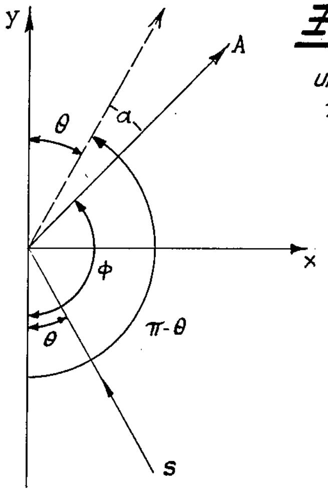
Figures 9, 10:
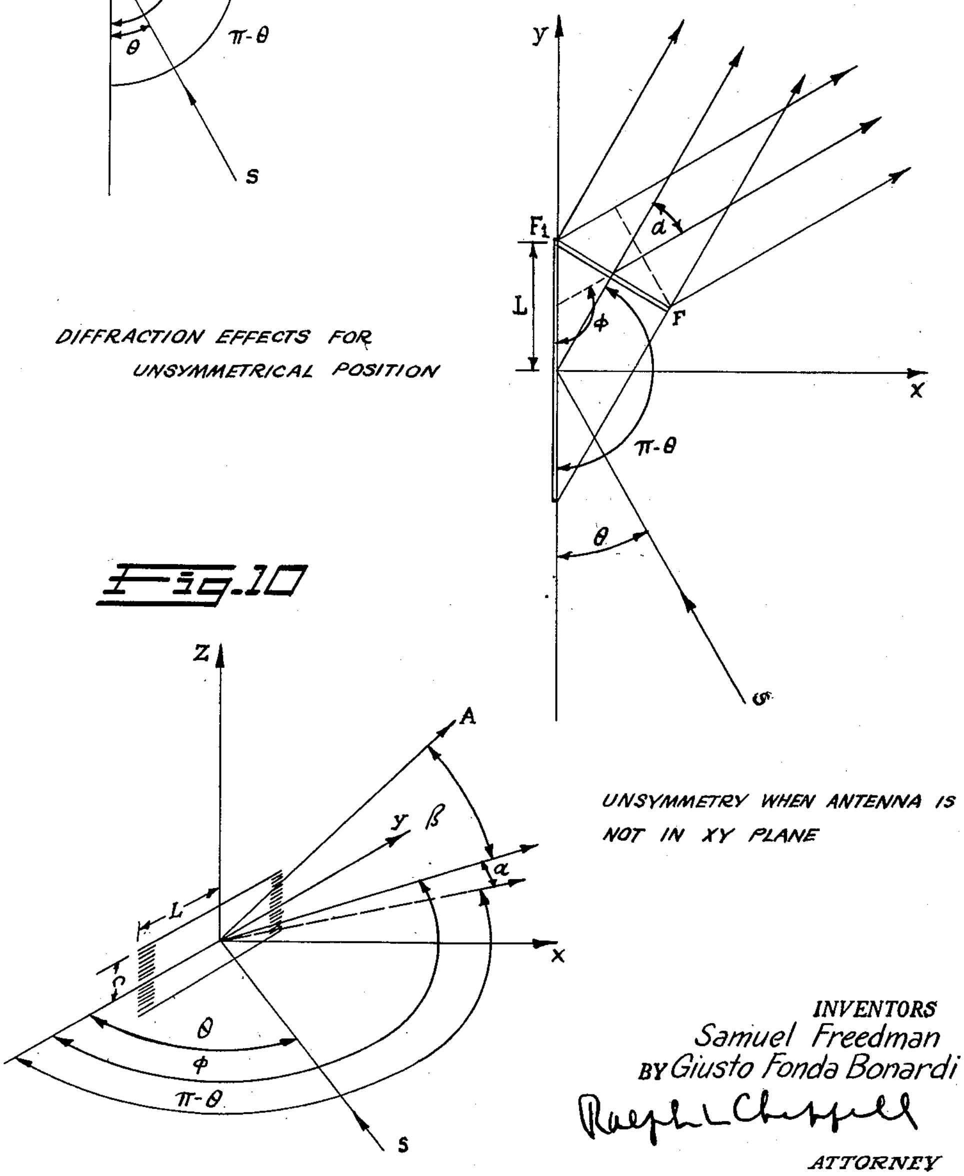
Figure 11:
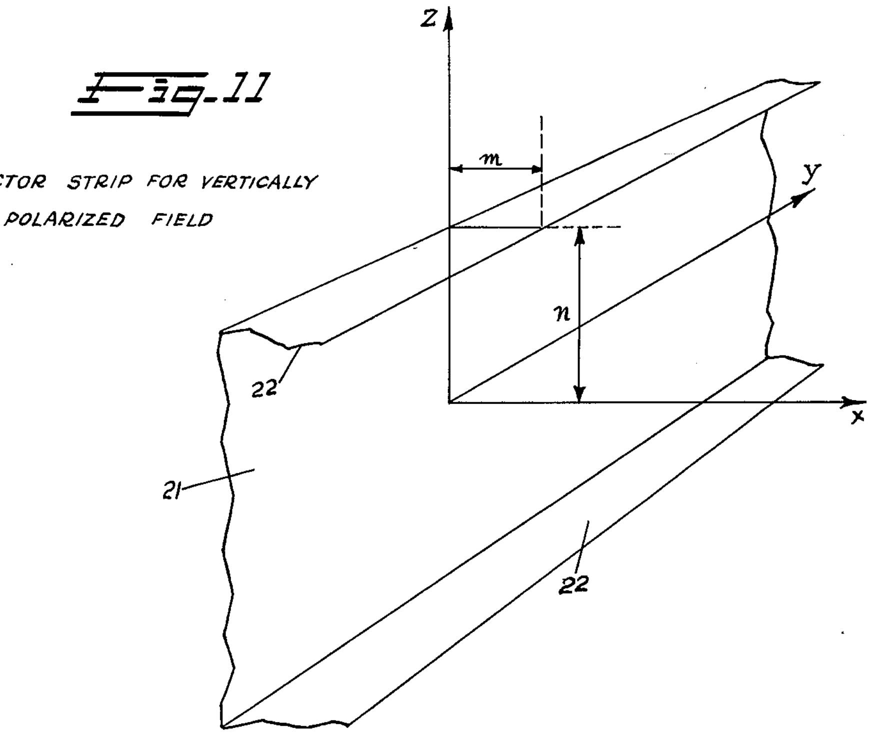
Figure 13:
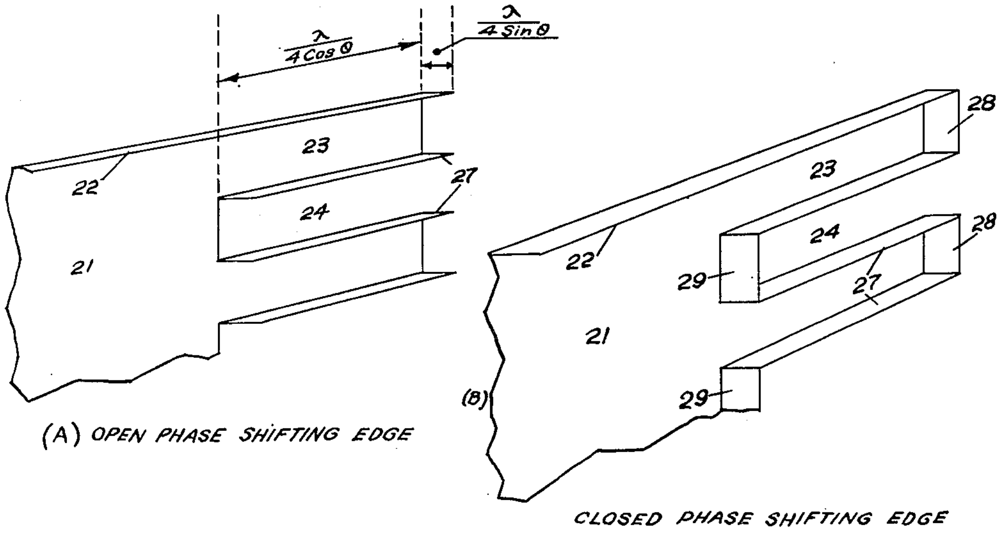
Figure 12:
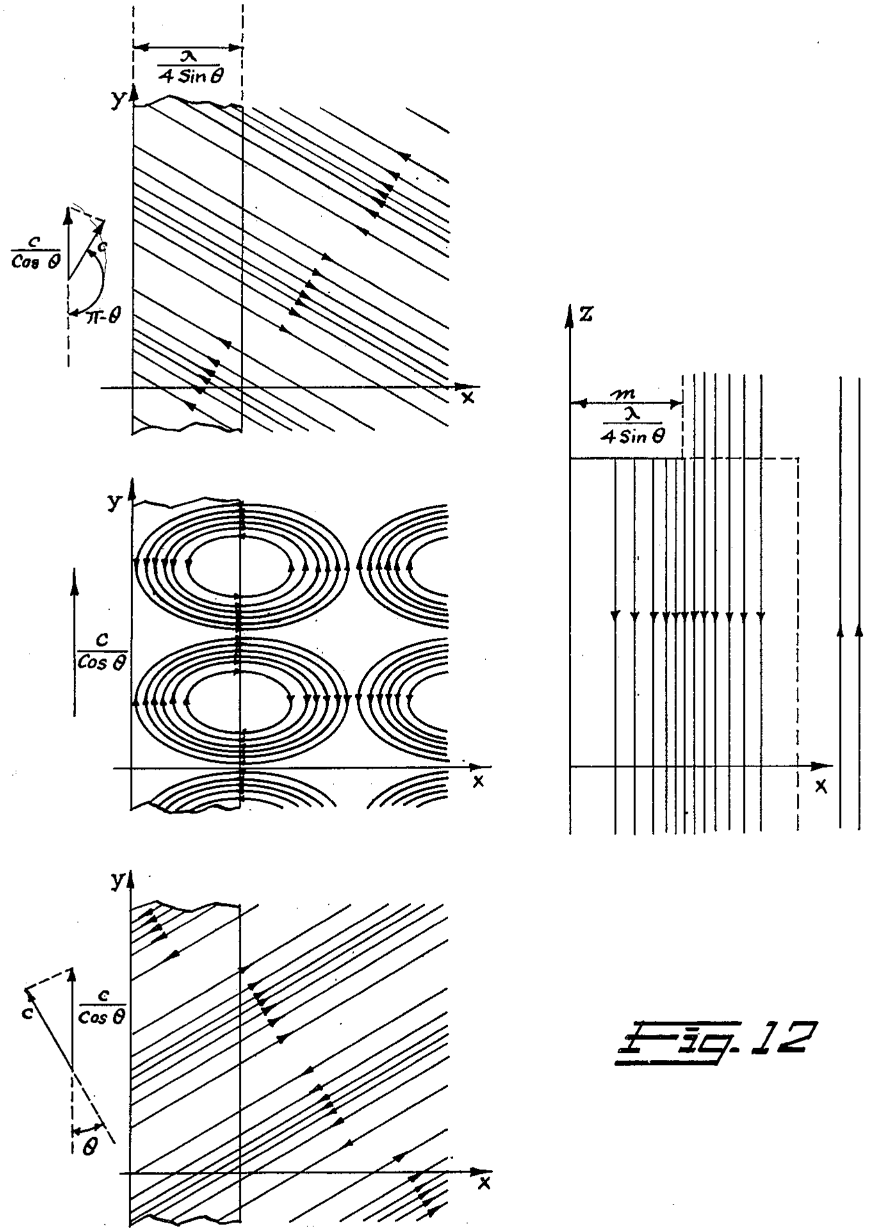

Further objects and advantages of this invention, as well as the apparatus, arrangement, operation and method, will be apparent from the following description and claims in connection with the accompanying drawings, in which, Figure 1 is a representation of the reflection of a wave from an infinite plane, Figure 2 is a fragmentary section of a flat reflecting strip shown in relation to a rectangular cartesian coordinate system, Figure 3 is a graphical representation of horizontally polarized fields existing in the neighborhood of the reflector of Figure 2, Figure 4 is a graph indicating phase displacement resulting from difference in length of two reflector strips, Figure 5 is a fragmentary end section of a reflector embodying one feature of this invention and showing a phase shifting end thereof, Figure 6 is a reflector polar diagram showing reflected power and percentage of maximum efficiency versus change of direction for a series of stated frequencies, Figure 7 is a reflector cartesian diagram showing reflected power and percentage of maximum efficiency versus the change of frequency for a series of stated directions, Figure 8 is a cartesian diagram showing unsymmetry when the antenna is moved with respect to the reflector and the source of the waves, Figure 9 is a cartesian diagram showing diffraction effects for an unsymmetrical position such as shown in Figure 8, Figure 10 is a cartesian diagram showing the unsymmetrical condition in relation to the reflector when the antenna also moves out of the XY plane, Figure 11 is a fragmentary section of a wing type reflecting strip for a vertically polarized field, and embodying another feature of this invention, Figure 12 is a graphical representation, similar to Figure 3, showing the field patterns existing upon a wing type reflecting strip as shown in Figure 11, and Figure 13 is a fragmentary sketch showing several modifications of the phase shifting ends upon the wing type reflecting strip of Figure 11.

A finite plane is considered one where the wave length of the electromagnetic wave which is to be reflected, is a substantial dimension with respect to the length of the reflector itself. This is the case in radio or radar on any frequency thus far employed. Usually a wave arriving on a finite conducting surface sets up a standing wave system so that this surface acts like a scatterer and radiates power in all directions. The reflected field is not a plane field, i. e. with parallel wave fronts, but is a spherical field with spherical concentrical wave fronts.

The difference in efficiency of a scattering system, i. e. a finite plane, versus that of an optical system, i. e. an infiinite plane, greatly increases with distance.

Figure 1 illustrates an optical reflection wherein S represents the source of energy; A represents the receiver or antenna; C is the plane of the reflector; B is the point at which the power from S strikes the reflector; $a$ is the useful area of the receiver; $b$ is the area of a reflector of finite dimensions in the reflecting plane C; S' is an imaginary source of energy situated on the other side of the reflector and symmetrical to the real source S; $\theta$ is the angle of incidence; $r_1$ is the distance from the source S to the point of reflection B, and $r_2$ is the distance from the point of reflection B to the receiver A.

*Example.*—In the radar case, where the distance from the detecting vessel to the target vessel ($r_1$) is the same as from the target vessel back to the detecting vessel ($r_2$), assume the distance each way to be 10 miles. (See Figure 1.)

Then using Equations 1 and 4 derived in Part I of the following section on theory the finite and infinite cases compute as follows:

Finite case $$\text{Power}=\frac{K}{(4\text{ pi } r_1r_2)2}$$

$$=\frac{K}{(12.56\times10\times10)}2$$

$$=\frac{K}{1,577,500}$$

Infinite case $$\text{Power}=\frac{K'}{4\text{ pi }(r_1\text{ plus }r_2)2}$$

$$=\frac{K'}{12.56\ (10\text{ plus }10)}2$$

$$=\frac{K'}{5024}$$

Since K would never be greater than K' and is usually much less than K', as may be seen from Part I of the theory, the ratio of efficiency of the infinite to the finite case is at least $$\frac{1,577,500}{5024}=313.6\text{ times}$$

This indicates that under ideal conditions of reflection, the reflected power will be at least 313 times greater in the above example for an infinite surface as compared to a finite surface.

This difference is less pronounced when the distances are less and is increasingly greater as the distances are more than those mentioned in the example above.

For communication purposes the reflector may be used under conditions where the outgoing signal instead of returning to the source as in the case of radar, proceeds onward in a new direction in order to reach a receiving location at a remote location that may be beyond or around an obstructed horizon. There the distance from the transmitting source to reflector ($r_1$) would not necessarily be the same as the distance from reflector to receiving point or a subsequent reflector ($r_2$).

*Example.*—Assume $r_1$ is 10 miles while $r_2$ is 20 miles.

Finite case $$\text{Power}=\frac{K}{(12.56\ 10\times20)}2$$

$$=\frac{K}{6,310,000}$$

Infinite case $$\text{Power}=\frac{K'}{12.56\ (10\text{ plus }20)}2$$

$$=\frac{K'}{11304}$$

ratio of efficiency=approximately $$\frac{6,310,000}{11304}=486.4\text{ times}$$

In simple words, it may be stated that in the finite case the power falls off inversely to the square of 4 pi times the product of $r_1$ and $r_2$ squared. In the infinite case the power falls off only 4 pi (not 4 pi squared) times the sum squared (not the product squared) of $r_1$ and $r_2$.

This important difference in efficiency results from the fact that in the finite case the arriving plane wave system is absorbed and scatters to become a new spherical system. This new spherical system propagates in all directions. In the infinite case, however, the arriving plane wave system still remains a plane wave system after reflection, propagating in a direction symmetrical to that of the arriving system (see Figure 1).

A plane system of electromagnetic waves does not change its plane characteristics if in any point in space, the Maxwell equations (i. e. the equations which are the basis of electromagnetic propagation) can be satisfied by the equations of a plane wave propagation, both for the electric field and for the magnetic field. Maxwell's equations provide in every point of space, some kind of equilibrium between the electric field and the change of the magnetic field; and a similar balance between the magnetic field and the change of the electric field. It is inconsequential if this change is a displacement current or a conduction current. The Equations 27 given in the following section on theory represent a field satisfying Maxwell's equations.

In the case of an abrupt change of the means of propagation, like for the presence of a conducting surface, it is necessary to substitute the displacement current in the space beyond the conducting surface with the actual conduction current on the surface in order to maintain the balance with the magnetic field at the surface. In the case of a single arriving system, this balance can be maintained only with the additional presence of a reflected system, so that the resulting field will be balanced by the current set up by the first system in the conducting surface. If this conducting surface has to reflect a plane system, the currents which circulate in it must be such as to balance the field resulting from the simultaneous presence of an arriving plane wave system and a reflected one.

The following section on theory shows that this can be done by proper choosing of the shape of the reflector and the characteristics of the field. A field polarized in the plane containing the source and the center of the reflector requires a flat sheet (see Part II theory) as in Figure 2, wherein 21 represents a fragmentary section of a flat reflecting sheet having a width of $2n$, and being in the YZ plane.

A field polarized perpendicularly to that plane requires the addition of two wings of definite width to the same flat sheet (see Part V) as in Figure 11, wherein the reflecting sheet 21 is provided with a wing 22 of a width $m$ upon each edge. The wings 22 are shown parallel to the XY plane while the reflecting sheet 21 is in the YZ plane, i. e. the wings 22 are perpendicular to the reflector 21.

In both cases the nearest end of the reflector 21 and the opposite one should be cut in a series of projecting strips 23 of a definite length (see Parts III and V theory) as in Figures 5 and 13 in order to insure the proper distribution of currents near a discontinuity such as the end of the conducting surface. Figure 5 shows a fragmentary end section of a flat reflector 21 having a series of projecting strips 23 extending from the end. The space 24 between the strips 23 is of the same width as the strip 23. The projecting strips 23 may be considered as merely extensions of imaginary trip 25 indicated by dotted lines extending the complete length of the reflector. The adjacent portion 26 of the reflector may then be considered as a similar strip of shorter length. Each strip 25 and the adjacent strip 26 forms a so-called phase shifting couple, the purpose of which will be more fully explained below. The reflector is composed of one or more of these phase shifting couples.

In the case of the wing reflector, each projecting strip 23 must carry its own wings of the same width as the side ones 22 (Figure 13). The part A of Figure 13 shows a fragmentary section of one embodiment of the wing type reflector wherein 21 is a flat reflecting sheet having projecting strips 23 extending from the ends as in Figure 5. This reflector also has wings 22 perpendicular to each outer edge as in Figure 11, and further has wings 27 of the same width as the wings 22 upon each of the side edges of the projecting strips 23 also perpendicular thereto.

Figure 13B shows another embodiment of the wing type reflector which is identical to that of Figure 13A with the exception of the closed ends upon the strips 23. Closures 28 are provided upon the outer ends of the strips 23 between the wings 27, and closures 29 are provided at the inner ends.

The length of the projecting end strips 23 and the width of the wings 22 are stated by the theory Equations 28 and 48:

$$\Delta y=\frac{\lambda_t}{4}=\frac{\lambda}{4\cos\theta} \quad (28)$$

$$m=\frac{\lambda}{4\sin\theta} \quad (48)$$

where delta $y$ is the length of the projecting strip 23, $m$ is the width of the wings 22 or 27, $\lambda$ (lambda) is the wavelength in free space, $\lambda_t$ is the wavelength along the reflector, and $\theta$ (theta) is the reflection angle.

The phase displacement resulting in a length difference of $$\Delta y=\frac{\lambda_t}{4}$$

between two strips is illustrated in Figure 4. The direct current wave is shown by a full line and the reflected wave is shown by the dotted line. It is seen that the reflected waves are 180° or completely out of phase on the two strips. Their fields thus destroy each other so that the total effect will be lack of back radiation. The reflector of this invention may be considered as consisting of a number of such strips each pair of which comprises an elementary or unit reflector. The narrower the strips, the better will be the result. Therefore upon the actual reflector a plurality of pairs of the phase shifting strips or unit reflectors are used. The resulting shape of the reflector is shown in Figure 5, which shows one end of a reflector in which twelve of the phase shifting couples or unit reflectors are employed. The other end of the reflector is of similar construction. A reflector of this design is suitable for use with a horizontally polarized field.

For a vertically polarized field a wing of a width corresponding to one-quarter of the wavelength in free space divided by the sine of the reflection angle $$\left(m=\frac{\lambda}{4\sin\theta}\right)$$

must be added to each edge of the flat reflector and to each edge of the end strips perpendicular to the said edges (see Figure 11). The wings of each elementary end strip may be either left open or closed by a conducting wall at their ends (see Figure 13).

In this case the reflector acts like a mirror which beams the radiation in a direction symmetrical to the source, i. e. with angle of reflection equal to angle of incidence. It is clear that the strips which form the so-called "phase shifting end" and the "wings" must be tuned both for frequency and direction. A change of frequency or a change of direction affects the efficiency of the reflector. The effect of these changes may be plotted as in Figures 6 and 7.

Figure 6 is a polar diagram showing the change of reflected power and percentage efficiency vs. change of direction for a series of stated frequencies. Figure 7 is a cartesian diagram showing the change of reflected power and percentage efficiency vs. the change of frequency for a series of stated directions. In both graphs the term frequency omega sub zero appears. This is the cut-off frequency of the reflector. The cut-off frequency is that frequency which would have the maximum power reflection at zero reflection angle, where reflection no longer occurs. This is the lowest frequency that the reflector is able to reflect with maximum efficiency.

By dividing the speed of light or radio (approximately 300,000,000 meters per second) by the cut-off frequency, we obtain the cut-off wavelength. It has to be pointed out that the cut-off wavelength is four times longer than the strips which make the phase shifting end; i. e. the phase shifting end is one quarter of the cut-off wavelength. That is, if the reflection angle $\theta=0$, using the equation $$\Delta y=\frac{\lambda}{4\cos\theta},\ \cos\theta=1$$

then $\Delta y=\frac{1}{4}\lambda$ or $\lambda=4\Delta y$. Therefore, the reflection pattern for a stated reflector substantially depends upon the length of the phase shifting end, which determines the cut-off frequency. By using Figure 6 it is possible to determine how the reflection efficiency changes with a change of the reflection angle for a series of stated frequencies where each frequency is greater than the cut-off frequency. It is done by finding out the intersection of the curve identified by the desired frequency, with a line drawn from the left corner (center of the polar diagram) and making the desired angle with the abscissa. The length of the radius from the center to this point, transferred on either side of the graph indicates directly the percentage of efficiency. The best reflection angle for every frequency and its value is written under the line which departs from the most external point of every curve.

As an example of the use of Figure 6, assume that the desired reflection angle is 45 degrees and that a frequency 1.3 times the cut-off frequency is used. A line is then drawn from the left corner which makes an angle of 45 degrees with the abscissa. The intersection of this line with the curve labeled 1.3 is now marked . Using the length of the line from the center to this point as a radius an arc is laid off on the chart. The percentage of efficiency is read from either axis where the arc cuts the axis. In the case of 45° the efficiency is found to be approximately 97%. Using an angle of reflection of 60° and the same frequency (1.3 times the cut-off value) the efficiency of the reflector is found to be approximately 72%.

By using Figure 7, it is possible to determine how the reflection efficiency changes by changing the frequency for a series of stated angles. This graph may be useful if F. M. is used on the reflected beam. It is clear that the change of efficiency is negligible if the frequency deviation is percentually small with respect to the carrier and if the carrier is near the maximum efficiency frequency for that angle.

For example, taking a reflection angle of 60° and a frequency of 1.3 times the cut-off frequency, using Figure 7, a line is drawn normal to the abscissa at the point marked 1.3 on the frequency scale. From the point at which this line intersects the 60° curve a line is drawn parallel to the abscissa. The percent efficiency is read from the point at which this line intersects the ordinate. Using a frequency of 1.3 the efficiency is found to be approximately 72%. Using a frequency of 1.6 times the cut-off frequency and an angle of 60° the efficiency is found to be approximately 89%. Likewise a frequency of 2 times the cut-off frequency is found to be 100% efficient with an angle of 60°.

It is also pointed out that the reflection efficiencies plotted in Figures 6 and 7 refer to a direction symmetrical to that of the direct beam, namely to the direction in which light would be reflected if the reflector was a mirror. In this case it is obvious that the light intensity would decrease abruptly simply by moving off the reflected light beam.

The same thing happens with the microwave reflected beam. Figures 6 and 7 give the reflection efficiency for the center of the reflected beam. Moving away from this direction, the reflected power decreases too although not so abruptly as in the case of the light beam. This is because of secondary lobes due to diffraction. Diffration in turn is due to the fact that the dimensions of the reflector are comparable with the wave length. The smaller the reflector, the greater will be this diffraction effect. Diffraction in this case may be defined as the deviation of the radio beam from a straight course resulting from the edge effect of a relatively small reflecting surface.

Large reflectors therefore should be used for concentrating power in narrow beams. Small reflectors should be used for distributing power in wider beams particularly where several possible positions of a mobile station are to be covered with a single reflector. If a single reflector is not sufficient to cover all positions of the movable station, several reflectors may be used as needed to integrate each other by means of secondary lobes. In this case it might be a compound twisted reflector.

If reflectors are bent in order to accomplish any type of focusing, defocusing or beaming effects in free space or near any kind of radiating or receiving device, a definite reflection angle will appear at every point of the reflector between the direction of the power flow and the plane which is tangent to the reflector at that point.

If the field is such as to require a wing reflector, the width of the wings must be tuned at every point with regard to the actual reflection angle at that point if maximum efficiency is to be obtained. Similarly the length of the phase shifting end must be tuned with regard to the reflection angle measured between the direction of the power flow and the plane tangent to the reflector at the end.

Some of the many advantages and novel features of the present invention are listed as follows:

1. The reflector functions with a high degree of efficiency with simple forms and shapes such as a flat surface for horizontally polarized waves. Horizontally polarized field means that the electric vector is parallel to the plane of reflection, i. e. the plane which contains the source, the reflector and the receiver.

2. It functions efficiently with the same shape and surface, provided wings are added, for vertically polarized waves. Vertically polarized field here means that the electric vector is perpendicular to said plane.

3. The efficiency depends upon the length of the phase shifting end which must be tuned, i. e. formed or cut to that size according to the frequency employed and the reflection angle.

4. Phase shifting ends are used to avoid the existence of standing waves of current along the reflector. Standing waves result in back radiation across the source and low reflection efficiency.

5. Phasing ends are also used with curved or bent reflectors.

6. The flat reflectors may be used for distant reflecting around a corner, an obstruction, or to extend the useful horizon.

7. The bent reflector or curved reflector may be used for any kind of focusing, defocusing, or beaming effects in free space or near any kind of radiating or receiving device.

8. The efficiency of an infinite plane is obtained with a plane of finite dimensions, by the use of phasing ends only for a horizontally polarized field. By the addition of wings, this is also possible for a vertically polarized field.

9. Standing waves resulting from edge or discontinuity effects are eliminated.

10. Attenuation is less since the power at the receiver varies inversely with 4 pi times the square of the sum of the distances from the source to the reflector and from the reflector to the receiver instead of varying inversely as the square of 4 pi times the product of the two distances.

THEORY

*Part I.—The general case*

The problem of transmission of radiation power from a source to a load (receiving antenna, array, horn, etc.) after a reflection over a conducting surface, is completely solved when the reflector is a perfectly conducting plane of infinite width and length.

This case is analogous to an "optical" reflection as shown in Figure 1. The receiving device A looks into the arriving reflected power as if it came from a virtual source S′ situated on the other side of the reflecting plane, symmetrical to the real one S.

If $a$ is assumed to be the equivalent useful area of the receiving device, being in a plane perpendicular to the line drawn from A to S' (i. e. to the direction of the reflected power flow), the power crossing $a$ is:

$$(1)\qquad P_a=P_s\frac{a}{4\pi(r_1+r_2)^2}$$

where $P_s$ is the total radiated power $P_a$ is the power crossing $a$ $r_1$ and $r_2$ are the distances of S and A respectively from the point B B is the point where the line from A to S' crosses the reflector Equation 1 must be multiplied by $G_s$ (gain factor of the source) if this has a directional emission.

Now assume $r_1$ so large as to result in practically plane waves where the reflection takes place.

The power given by (1) is the power that strikes the reflector around the point B over an area which is the projection of $a$ from S' on the plane of the reflector . . . so that any other part of the reflector does not reflect useful power from S to $a$ . . . but, if the whole reflector is replaced with any part of it which contains the projection of $a$ with a finite area, for example $b$, which is even larger than the projection, then Equation 1 no longer is correct. This is because the field which arrives at B sets up in the $b$ area currents that depend upon the shape of $b$ and the characteristics of the field itself. In a general case, these currents result in standing waves which radiate the entire arriving power (the reflector being a perfect conductor) with a directional pattern that is dependent in turn upon the distribution of the current. If $G_b$ is the directional factor of the radiation from $b$ to $a$, the power reflected on $a$ is:

$$(2)\qquad P_a=G_bP_b\frac{a}{4\pi r_2^2}$$

where $P_b$ is the total power radiated by $b$. But, this is the power arriving from S on $b$, namely:

$$(3)\qquad P_b=P_s\frac{b\sin\theta}{4\pi r_1^2}$$

where $\theta$ is the angle of reflection so that $$(4)\qquad P_a=P_sG_b\frac{a\,b\sin\theta}{(4\pi r_1r_2)^2}$$

This value is far lower than that given by Equation 1.

The proper field and the proper shape of $b$, in order to reproduce with a finite reflector the reflection characteristics of an infinite reflecting plane will now be worked out.

*Part II.—Plane reflector with one limited dimension. Reflecting strip*

Consider a rectangular cartesian coordinate system as shown in Figure 2 and let the ZY plane be the reflecting plane. A and S are assumed upon the positive X side of it, both lying in the XY plane so that the positive Y direction makes the smallest angle with the power flow direction, both direct and reflected.

Then the width of the reflecting plane may be limited between two parallel lines, so as to have a reflecting strip between $z=\pm n$, where $n$ equals one-half the width of the strip.

If this strip has to act as an infinite plane in the whole space between the two planes $z=+n$ and $z=-n$, then the field must be the same as in the case of the infinite plane. The field must then:

(a) Be composed of a direct plane wave system and a reflected one (b) Propagate in directions parallel to the XY plane (c) Have the electric field vector parallel to the X axis in the vicinity of the YZ plane (d) Have the magnetic field vector parallel to the YZ plane in the vicinity of it (e) Have the magnetic field vector along the lines $z=n$, $x=0$ *and* $z=-n$, $x=0$ (i. e. the edges of the strip) perpendicular to them, because there the current may flow only in the Y direction (f) Satisfy Maxwell's equations Mathematically, these requirements are expressed in the following equations: in which, E—Electric field intensity H—Magnetic field intensity $c$—Speed of light $t$—Time $x, y, z$—Distances along the X, Y and Z axis respectively $\theta$—Angle of incidence $E_x, E_y, E_z$—Electromotive force components along the X, Y and Z aris respectively $H_x, H_y, H_z$—Magnetic field components along the X, Y and Z axis, respectively $\mu$—Coefficient of permeability $\omega$—Angular frequency $\theta_r$—180° $-\theta$ (a) and (b) may be expressed as:

$$(5)\qquad E=F_1\left(t+\frac{x\sin\theta}{c}-\frac{y\cos\theta}{c}\right)-F_1\left(t-\frac{x\sin\theta}{c}-\frac{y\cos\theta}{c}\right)$$

$$(6)\qquad H=F_2\left(t+\frac{x\sin\theta}{c}-\frac{y\cos\theta}{c}\right)-F_2\left(t-\frac{x\sin\theta}{c}-\frac{y\cos\theta}{c}\right)$$

where $F_1$, $F_2$ are functions of the whole variable in brackets.

Then the partial derivative of any element of the field in respect to $z$ must be equal to zero; i. e.:

$$(7)\qquad \text{Operator } \frac{d}{dz}=0$$

(c)

$$(8)\qquad E_z=E_y=0 \text{ at } X=0 \text{ at any time}$$

(d)

$$(9)\qquad H_x=0 \text{ at } x=0 \text{ at any time}$$

(e)

$$(10)\qquad H_y=0 \text{ at } x=0,\ Z=\pm n \text{ at any time}$$

(f)

$$(11)\qquad \frac{d^2E}{dx^2}+\frac{d^2E}{dy^2}+\frac{d^2E}{dz^2}=\frac{1}{c^2}\frac{d^2E}{dt^2}$$

$$(12)\qquad \text{Div } E=0,\ \text{curl } E=-\mu\frac{dH}{dt}$$

plus two similar equations for H.

From (6) it follows that $H_y=0$ not only along the $z=\pm n$, $x=0$ lines, but everywhere at the surface of the strip ($x=0$); therefore $$(13)\qquad \frac{dH_y}{dt}=0(x=0)$$

Now, from one of Maxwell's equations the equivalent to (12) follows:

(14) $$-\mu\frac{dH_y}{dt}=\frac{dE_x}{dz}-\frac{dE_z}{dx}=0(X=0)$$

(15) $$\frac{dE_x}{dz}=\frac{dE_z}{dx}(X=0)$$

and, remembering (7)

(16) $$\frac{dE_z}{dx}=0(X=0)$$

Applying (5) to the $E_z$ component to the electric field, knowing that any periodic function F may be considered as a sum of a number of sine law components, it is sufficient to consider:

(17)
$$E_z=E_{z,0}\left[\sin\omega\left(t+\frac{x\sin\theta}{c}-\frac{y\cos\theta}{c}\right)-\sin\omega\left(t-\frac{x\sin\theta}{c}-\frac{y\cos\theta}{c}\right)\right]$$

which fits with (8); but

(18)
$$\frac{dE_z}{dx}=E_{z,0}\frac{\sin\theta}{c}\omega\left[\cos\omega\left(t+\frac{x\sin\theta}{c}-\frac{y\cos\theta}{c}\right)+\cos\omega\left(t-\frac{x\sin\theta}{c}-\frac{y\cos\theta}{c}\right)\right]$$

which is equal to zero only when

(19) $$E_{z,0}=0$$

(if $\theta=0$ there is no reflection). So it is seen that the plane wave system must be polarized in the XY plane Consider now, vector E as the sum of $E_x$ and $E_y$.

It will be:

(20) $$E_x=E\cos\theta$$
(21) $$E_y=E\sin\theta$$

both for the direct and for the reflected waves. But, $\theta_r$ for the reflected wave is equal to $\pi-\theta$ (i. e. $180°-\theta$) for the direct wave. If $F_1$ and $F_2$ are both simple sine functions (5) becomes:

(22)
$$E=E_0\sin\omega\left(t+\frac{x\sin\theta}{c}-\frac{y\cos\theta}{c}\right)-E_0\sin\omega\left(t-\frac{x\sin\theta}{c}-\frac{y\cos\theta}{c}\right)$$

then

(23) $$E_x=E_0\cos\theta\sin\omega A+E_0\cos\theta\sin\omega B$$
$$E_y=E_0\sin\theta\sin\omega A-E_0\sin\theta\sin\omega B$$

where A and B are:

(24) $$A=t+\frac{x\sin\theta}{c}-\frac{y\cos\theta}{c}$$

and

(25) $$B=t-\frac{x\sin\theta}{c}-\frac{y\cos\theta}{c}$$

(26) $$E_x=E_0\cos\theta(\sin\omega A+\sin\omega B)$$
$$E_y=E_0\sin\theta(\sin\omega A-\sin\omega B)$$

(27) $$E_x=2E_0\cos\theta\sin\omega\left(t-\frac{y\cos\theta}{c}\right)\cos\omega\frac{x\sin\theta}{c}$$
$$E_y=2E_0\sin\theta\sin\omega\frac{x\sin\theta}{c}\cos\omega\left(t-\frac{y\cos\theta}{c}\right)$$

It is apparent that (27) fits with Maxwell's equations (11) and (12). This is then a field which meets all of the above requirements. The E vector being always parallel to the XY plane, a plot of it can be drawn that is only in the XY plane. This is shown in Figure 3 where the lower part shows the direct wave system, the middle part the resulting field near the reflector, and the upper part the reflected wave system. The arrows behind the reflector show the motion of the whole field configuration and the vector composition of the velocities. The pattern is frozen at time $t=0$. It is now apparent that a plane reflector with only one limited dimension may act in the same manner as a reflector of infinite dimensions.

*Part III.—Plane reflector with two limited dimensions. Reflecting strip of finite length. Phase shifting couple*

If a piece of reflecting strip is cut to a given length, with both ends to reflect back along the strip the current waves which move along it as an effect of the moving field; the reflected current waves will build up a damped (because of the energy loss due to radiation) wave system. If the reflected current waves moving back in the −Y direction have the same shape and speed of the direct ones, their energy will be radiated back in the direction of the direct field. This will be weakened by the exact amount of power which is connected with the reflected current waves, and which is totally lost for the reflected field. The performance of the reflector becomes lower through the effect of an abrupt ending of the strip.

Comparing the phases of the reflected current waves in two reflector strips with a length difference of

(28) $$y_2-y_1 \text{ or } \Delta y=\frac{\lambda t}{4}=\frac{1}{4}\frac{\lambda}{\cos\theta}$$

where $y_2$ and $y_1$ are the respective lengths of the two strips $\lambda t$ is the wave length along the strip and
$\lambda$ is the wave length in free space
$\theta$ is the reflection angle it is seen that there is a phase shift of $\pi$ radians or 180°. This means the two reflected waves are completely out of phase as shown in Figure 4 where the full line shows the direct current wave, while the dotted lines show the reflected one. Their fields will then destroy each other, so that the total effect will be lack of back radiation. The narrower the strips, then the better will be the result. In order to have a considerable amount of reflected power, several pairs of phase shifting strips may be used. The resulting shape of the reflector will then be as shown in Figure 5.

*Part IV.—Directional effects of the phase shifting edge*

Both a change of $\lambda$ and a change of $\theta$ may produce a change of $\lambda_t$, which in turn brings the reflected current waves slightly back in phase again. This results in back radiation and lower performance of the whole reflector. Calling $\Delta y$ the length difference between the phase shifting strips, the back reflected power $P_\theta$ is then:

(29) $$P_\theta=P_0\sin^2\frac{\delta}{2}$$

and the reflected power $P_{\pi-\theta}$:

(30) $$P_{\pi-\theta}=P_0\left(1-\sin^2\frac{\delta}{2}\right)=P_0\cos^2\frac{\delta}{2}$$

Where $P_0$ is the power that would be reflected in the case of perfect tuning conditions and $\delta$ is the re-phasing angle between the two currents. Now

(31) $$\frac{\delta}{2}=\frac{\pi}{2}\left(1-\frac{\lambda_0}{\lambda_t}\right)$$

where $\lambda_0$ is the original wave length along the strip, and $\lambda_t$ is the new one.

But by construction it is

(32) $\lambda_0=4\Delta y$ so that referring to

(33) $$\lambda_t=\frac{\lambda}{\cos\theta}\ (\lambda \text{ in free space})$$

therefore (30) becomes:

(34) $$P_{\pi-\theta}=P_0\cos^2\left(\frac{\pi}{2}-2\pi\frac{\Delta y}{\lambda}\cos\theta\right)$$

$$=P_0\sin^2\left(2\pi\frac{\Delta y}{\lambda}\cos\theta\right)$$

It is therefore evident that every frequency gives to $$\frac{\Delta y}{\lambda}$$

a known value. It is then possible to plot $P_{\pi-\theta}$ vs. $\theta$ for every $\omega$.

We may call $\omega_0$ that value of $\omega$ which makes

(35) $$\frac{\Delta y}{\lambda}=\tfrac{1}{4}$$

and label our patterns in terms of $$\frac{\omega}{\omega_0}$$

in order to be free from actual measurements as $\Delta y$ and $\lambda$. See Fig. 6.

At the same time $P_{\pi-\theta}$ vs. $\omega$ may be plotted for every $\theta$. This graph may be useful to determine what band of frequencies may be reflected on the same beam with a reasonably small change of power (see Figure 7).

But, (34) with Figures 6 and 7, refer to what happens near the edge of the reflector. If the whole length of the reflector is considered, it is apparent that the reflected power is greater on any $\theta_r$ because of the attenuation of the reflected current wave system, and of the possible reflection of the opposite edge of the reflector. Both of these reduce the back radiation along the strip (where the arriving power is constant). Depending on the actual length of the reflector, the patterns of Figure 6 and Figure 7 may be somewhat more rounded and flat.

It must be pointed out that in Figures 6 and 7, $\theta_r$ for the reflected wave is equal to $\pi-\theta$ or $180°-\theta$ for the direct one. This means that the power is measured in a direction which is symmetrical to that of the arriving power.

Figures 8 and 9 represent cases wherein the antenna A is in the same horizontal plane (i. e. the XY plane) as the reflected power but is in a different vertical plane from that containing the line representing reflected power. The power arriving at the reflecting plane makes an angle of $\theta$ with this plane and is reflected at an angle of $\pi-\theta$ ($180°-\theta$). The antenna A is in a direction of $\phi$ from the reflecting plane which differs from $\pi-\theta$ by an angle of $\alpha$.

Figure 10 shows an instance in which the antenna A lies in a vertical plane differing from that containing the line representing reflected power by an angle of $\alpha$ (as in Figures 8 and 9), but in which the antenna A lies outside of the XY plane. The line in the A direction in this case makes an angle of $\beta$ with the XY plane.

In Figures 9 and 10 the length of the reflector is 2L and the width is $2n$.

Now, considering Figure 8, if the power is measured in a direction $\phi$ different from $\pi-\theta$, (34) no longer holds. This may happen when S (or A) moves with respect to the reflector while A (or S) does not move, or when both move in an unsymmetrical manner. In this case (34) will hold only in the $\pi-\theta$ direction, while in the $\phi$ direction, the power may be evaluated as described below.

Consider Figure 9 in which a reflector 2L long is excited by a field arriving from the $\theta$ direction. The reflected power in the $\pi-\theta$ direction is given by (34), which power will be present at the front of the reflected wave when leaving the reflector. This wave front is $f=F_1-F$. By applying the Huyghens-Fresnel principle to this wave-front, we can evaluate the power per unit cross-length proceeding in the $\phi$ direction, on the XY plane.

This power per unit cross length will be proportional to the square of the resulting electric field at a distance so great as to make negligible the range differences from any point of the wave-front $f$. The resulting electric field is then proportional to the mean value of E over $f$, which is:

(36) $$E_m=\frac{E}{f\cos\alpha}\int_0^f\cos\omega\frac{f\cos\alpha\sin\alpha}{c}df\cos\alpha$$

where $\alpha=\pi-(\phi+\theta)$

(37) $$E_m=\frac{cE}{\omega f\cos\alpha\sin\alpha}\sin\omega\frac{f\sin\alpha\cos\alpha}{c}$$

and the total power crossing the new wave front will be

(38) $$P_\phi=P_{\pi-\theta}\frac{c^2}{\omega^2 f^2\sin^2\alpha}\sin^2\omega f\frac{\sin 2\alpha}{2c}$$

but

(39) $f=2L\sin\alpha$ (on the XY plane)

then

(40) $$P_\phi=P_{\pi-\theta}\frac{c^2}{4\omega^2L^2\sin^2\theta\sin^2\alpha}\sin^2\left(\frac{\omega L\sin\theta\sin 2\alpha}{c}\right)$$

(41) $$\frac{\omega L}{c}=2\pi\frac{L}{\lambda}$$

(42) $$P_\phi=P_{\pi-\theta}\left(\frac{\lambda}{L}\right)^2\left(\frac{\sin\left(2\pi\frac{L}{\lambda}\sin\theta\sin 2\alpha\right)}{2\pi\sin\theta\sin\alpha}\right)^2$$

This shows the propagating pattern on the XY plane. Considering then Figure 10 which shows a change of direction in a plane containing the Z axis and in the $\phi$ direction, we may use (43), which is quite analogous to (38). However the angle $\beta$ must now be considered, which is the angle between the new direction and the XY plane. Letting $P_{\phi,\beta}$ be the power in the new direction:

(43) $$P_{\phi,\beta}=P_\phi\frac{c^2}{\omega^2(2n)^2\,\text{rin}^2\beta}\sin^2\left(2\omega n\frac{\sin^2 2\beta}{2c}\right)$$

but

(44) $$\frac{\omega n}{c}=2\pi\frac{n}{\lambda}$$

(45) $$P_{\phi,\beta}=P_\phi\left(\frac{\lambda}{n}\right)^2\left(\frac{\sin\left(2\pi\frac{n}{\lambda}\sin 2\beta\right)}{2\pi\sin\beta}\right)^2$$

then (46)

$$P_{\phi,\beta}=P_{\pi-\theta}\left(\frac{\lambda^2}{nL}\right)^2\left[\frac{\sin\left(2\pi\frac{L}{\lambda}\sin 2\alpha\sin\theta\right)\sin\left(2\pi\frac{n}{\lambda}\sin 2\beta\right)}{4\pi^2\sin\theta\sin\alpha\sin\beta}\right]^2$$

This shows that the reflected power propagates in a narrow beam with the axis symmetrical to the direction of the direct power flow. Along this beam the power is given (in first approximation) by (34), but moving away from it both in the XY plane and out of it, the power decreases rapidly, as given by (46).

Now it is seen that (34) gives only the power crossing the wave front while leaving the reflector. Actually this is the reflected power and not the propagating power in the $\pi-\theta$ direction. This reflected power then propagates with a pattern as given by (46). This means that the power arriving at a receiving device placed in $\pi-\theta$ direction (i. e. $\alpha=0,\beta=0$), at a distance so great as to make L and $n$ negligible, is less than that given by (34), because a part of it has gone in other ($\alpha=0,\beta=0$) directions.

In a very narrow beam with most of the power arriving in the $\pi-\theta$ direction ($\alpha=0,\beta=0$) is desired L, $n$ must be large. If a broad beam, is desired with distributed power on a large area around the ($\alpha=0,\beta=0$) direction, L $n$ must be kept small.

*Part V.—Z-polarized field, wing reflector*

It has been shown that a plane reflector requires an XY polarized field. Now it will be seen that a Z polarized field may be handled by means of a suitably bent reflecting surface.

The total reflection of a Z polarized field requires that the X and Y components of the electric vector be everywhere and always equal to zero. However, the electric vector near a conducting surface must be zero, or perpendicular to the conducting surface. The magnetic vector must be parallel to it, and perpendicular to the edge of the conducting surface. (See section 2, Equations 5, 6, 7 and 8 for everywhere. Equations 9 and 10 for the edges. If edges are still parallel to the Y-axis see Equations 11 and 12.)

It has already been determined that a Z polarized field is impossible with a plane reflecting strip. But, if two perpendicularly bent wings, are added to the strip at the edges, forming a C cross section (as shown in Figure 11), with both of these wings being of proper and equal width ($m$), then the Z polarized field is possible. Now (10) holds for $z=\pm n$, $x=m$, and the following must be added:

(47) $$H_z=0 \text{ at } z=\pm n,\ 0<x<m$$

It is now apparent that (17) fits all conditions provided:

(48) $$m=\frac{\lambda}{4\sin\theta}$$

which is necessary to satisfy the boundary conditions for H, while (20) and (21) do not hold any more.

This may be also obvious by considering the reflector as the half of a wave guide excited in the $TE_{01}$ mode. The free presence of the field along the cut is balanced by the direct and reflected fields in the external space. The resulting field patterns are shown in Figure 12 where we can see the magnetic lines of force in the XY plane, using the same method of portrayal as in Figure 3. On the right side of the figure, is shown the electric field in the XZ plane.

It is then possible to apply Parts III and IV to this case with no important change. It is sufficient to point out that the wings of each elementary reflector may be either (*a*) left open or (*b*) closed by a conducting wall of their ends. See Figure 13.

*VI.—Cylindrical reflectors (non-plane)*

For focusing or defocusing effects, both around a transmitting or receiving device, or in any wave-optical problem, the reflector may be bent as required, getting a cylindrical surface, with the generatrices parallel to the Z-axis and any cross section over the XY plane. But, while a reflecting strip may reflect any XY field at any $\theta$ along its whole length, and requires a proper adjustment only in the phase shifting ends (according to the actual $\theta$ at the end), a wing reflector can not totally reflect a Z field in any direction, even if carefully tuned in its phase shifting ends. This is because of (48) which requires the tuning of $m$ along the whole length of the reflector according to the actual $\theta$ at every point of it.

This leads to the design of high performance beaming devices with very high directional gain factors.

What is claimed is:

1. A microwave reflector comprising a continuous flat reflecting sheet having at the ends thereof a plurality of projecting strips disposed in the plane of said reflector and of a length substantially equivalent to one quarter of the wave length at the operating frequency.

2. A reflector for ultra-high-frequency wave-energy comprising a continuous reflection medium having a plurality of coplanar projections at each end thereof, said projections being of a length substantially equivalent to $$\Delta y=\frac{\lambda t}{4}$$

where $\Delta y$ is the length of the projecting strips, and $\lambda_t$ is the wave length at the operating frequency.

3. A microwave reflector, comprising a central body portion and a pair of end portions, said end portions comprising a plurality of rectangular projections mutually spaced a distance substantially equal to their width and of a length substantially equivalent to $$\Delta y=\frac{\lambda}{4\cos\theta}$$

where $\Delta y$ is the length of the projections, $\lambda$ is the wave length in free space for the frequency involved, and $\theta$ is the angle of reflection.

4. A reflector for a vertically polarized field comprising a body portion, and perpendicularly disposed flanges of width substantially equivalent to $$m=\frac{\lambda}{4\sin\theta}$$

where $m$ is the width of the flanges, $\lambda$ is the wave length in free space for the frequency involved and $\theta$ is the reflection angle, said flanges being secured to opposite edges only of said body portion.

5. A microwave reflector for a vertically polarized field comprising a body member, a plurality of strips integral and coplanar with said body member and mutually spaced apart a distance approximately equal to their width and of a length substantially equivalent to $$\Delta y = \frac{\lambda}{4 \cos \theta}$$

where $\Delta y$ is the length of the projecting strips, $\lambda$ is the wave length in free space for the frequency involved, and $\theta$ is the angle of reflection, and flanges at the edges of the said body member and the edges of the said strips, said flanges being disposed perpendicularly relative said body member and said strips and having a width $$m = \frac{\lambda}{4 \sin \theta}$$

where $m$ is the width of the said flanges and $\lambda$ and $\theta$ are again wave length in free space for the frequency involved and reflection angle, respectively.

6. Microwave apparatus comprising a smooth continuous reflector, and at least one pair of reflecting strips integral with said reflector, at each end of said reflector and coplanarly disposed with respect thereto, the strips of each pair being laterally spaced from each other a distance equal to the width of a single strip.

7. Microwave apparatus comprising a smooth continuous reflector, at least one pair of reflecting strips integral with said reflector, at each end of said reflector and coplanarly disposed with respect to said reflector, and flanges upstanding from the free edges of said reflector and said strips.

8. Microwave apparatus comprising a continuous reflector, at least one pair of reflecting strips integral with said reflector, at each end of said reflector and coplanarly disposed with respect to said reflector, and flanges upstanding from the lateral edges of said reflector and said strips.

9. Microwave apparatus comprising a continuous reflector, a plurality of reflecting strips integral with said reflector, at each end of said reflector and coplanarly disposed with respect thereto, the strips of each pair being laterally spaced from each other a distance equal to the width of a single strip, and flanges upstanding from the free edges of said reflector and strips.

10. The apparatus as defined in claim 9, wherein said flanges are of uniform width and proportional to the length of the waves to be reflected therefrom.

11. The apparatus as defined in claim 9 wherein said strips are of equal length and proportional to the length of the waves to be reflected therefrom.

SAMUEL FREEDMAN.
GIUSTO FONDA BONARDI.

REFERENCES CITED

The following references are of record in the file of this patent:

UNITED STATES PATENTS

| Number | Name | Date |
|---|---|---|
| 1,906,546 | Darbord | May 2, 1933 |
| 2,270,314 | Kraus | Jan. 20, 1942 |
| 2,271,300 | Lindenblad | Jan. 27, 1942 |
| 2,281,196 | Lindenblad | Apr. 28, 1942 |
| 2,434,893 | Alford et al. | Jan. 27, 1948 |
| 2,480,154 | Masters | Aug. 30, 1949 |

FOREIGN PATENTS

| Number | Country | Date |
|---|---|---|
| 802,728 | France | Sept. 14, 1936 |